(12) United States Patent
Chen

(10) Patent No.: US 7,576,505 B2
(45) Date of Patent: Aug. 18, 2009

(54) DEVICE FOR FINDING A HOME POSITION FOR A MOVEABLE MEMBER

(76) Inventor: Jack Chen, 300 Windsor Dr., Oak Brook, IL (US) 60523

( * ) Notice: Subject to any disclaimer, the term of this patent is extended or adjusted under 35 U.S.C. 154(b) by 267 days.

(21) Appl. No.: 11/820,838

(22) Filed: Jun. 21, 2007

(65) Prior Publication Data
US 2008/0315821 A1    Dec. 25, 2008

(51) Int. Cl.
*G05D 3/00* (2006.01)
(52) U.S. Cl. .................. 318/466; 318/286; 318/369; 318/461
(58) Field of Classification Search ........... 318/466, 318/286, 369, 461
See application file for complete search history.

(56) References Cited

U.S. PATENT DOCUMENTS

| | | | | |
|---|---|---|---|---|
| 4,204,270 A | * | 5/1980 | Poirier d'Ange d'Orsay | 362/466 |
| 4,891,559 A | * | 1/1990 | Matsumoto et al. | 315/82 |
| 4,973,155 A | * | 11/1990 | Masuda | 356/121 |
| 5,751,832 A | * | 5/1998 | Panter et al. | 382/104 |
| 5,796,473 A | * | 8/1998 | Murata et al. | 356/121 |
| 5,877,680 A | * | 3/1999 | Okuchi et al. | 340/468 |
| 5,920,386 A | * | 7/1999 | Panter et al. | 356/121 |
| 6,373,378 B1 | * | 4/2002 | Ewerhart et al. | 340/425.5 |
| 6,626,564 B2 | * | 9/2003 | Horii et al. | 362/466 |
| 7,150,552 B2 | * | 12/2006 | Weidel | 362/545 |
| 7,264,386 B2 | * | 9/2007 | Ito et al. | 362/503 |
| 7,275,847 B2 | * | 10/2007 | Kiyota | 362/530 |
| 7,429,825 B2 | * | 9/2008 | Kubota et al. | 315/82 |

* cited by examiner

*Primary Examiner*—Rita Leykin
(74) *Attorney, Agent, or Firm*—Robert L. Marsh

(57) ABSTRACT

A device for finding a home position of a moveable member includes a magnet mounted on the moveable member and two switch-type Hall effect detectors, one on each side of the home position and equally spaced from the home position. The device includes a device for measuring movement of the moveable member and a microprocessor with a memory that receives information from the two Hall effect detectors and the device for measuring movement.

5 Claims, 2 Drawing Sheets

DEVICE FOR FINDING A HOME POSITION FOR A MOVEABLE MEMBER

The present invention relates to electronic controls for a device having a home position that must be repeatedly found.

BACKGROUND OF THE INVENTION

It is becoming increasingly common to provide electronic controls for mechanical devices, in fact, electronic controls can greatly enhance the effectiveness of various mechanical devices. For example, electronic detectors can measure the angle at which the steering wheels of a vehicle are turned and use the information to turn a vehicle's headlights to eliminate the road in the direction of the turn. One problem that does exist for such controls, however, is the maintenance of a home position to which a device, such as a headlight beam control, should return while the electronic control is not being called upon. In the case of electronically controlled headlights, the headlight should return to a home position in which they are aimed directly down a roadway when the vehicle wheels are neither turning to the right nor the left. Mechanical devices exist for finding a home position, but mechanical devices are subject to wear and parts that are in continuous use, as are adjustable headlights, may suffer wear and failure before other portions of a vehicle. One method of electronically detecting a home position for a moveable element is to provide a magnet on the moveable element and place an analog-type Hall effect detector at the home position. The output from the analog Hall effect detector is directed to a microcomputer and will enable the microcomputer to determine which direction the moveable member should move to return to its home position. Such Hall effect analog-type detectors are expensive, costing as much as four dollars each, and where numerous controls are needed for a complex device such as an automobile, the cost of providing analog-type Hall effect detectors in various control devices can be prohibitive. Switch-type Hall effect detectors, on the other hand, cost only about fifteen cents each.

It would be desirable to provide an electronic control that would return a moveable device to a home position and would rely upon electronic controls, such as a switch-type Hall effect detector, however, such switch-type detectors have only two states, activated by a magnetic field and deactivated. Furthermore, switch-type Hall effect detectors become activated when in the presence of a magnetic field that exceeds a given threshold. Where a magnet generates a field which significantly exceed the threshold for the switch-type Hall effect detector, the detector will remain in the activated position as a moveable member moves through the activation range. In the absence of further controls, a microcomputer relying upon input from a switch-type Hall effect detector is unable to accurately determine a home position within the actuation range of the switch. Furthermore, once the moveable member falls outside of an actuation range for a switch-type Hall effect detector, the detector provides no information as to which direction a moveable member must go if it is to return to its home position.

One obvious method of providing a home position is to provide fixed information as to the location of the home position directly into a microcomputer. For example, a headlight control that includes a motor that rotates a threaded shaft can receive input from a counter that counts the rotations of the shaft and records the direction of rotation thereby enabling the microcomputer to add or subtract rotations to measure movement of the moveable member away from its home position in either direction. It has been found, however, over long periods of time a microcomputer can lose an accurate memory of the home position. This could occur as a result of errors developing in the home position code stored within the microcomputer, or as a result of mechanical errors such as slippage of a follower with respect to a threaded member. Over a significant period of time, the home position for an adjustable headlight may become so seriously lost that the headlights are chronically directed to one side of the road or the other.

SUMMARY OF THE INVENTION

Briefly, the present invention is embodied in a device for moving a moveable member having a home position along a stationary continuum where the continuum has a first end and a second end and the home position is somewhere between the first and second ends. The device includes a magnet, preferably mounted on the moveable member, and a motor drivingly connected to the moveable member for moving the moveable member with respect to the continuum. The device further includes a computer or other controlling logic device for controlling the motor and thereby directing movement of the moveable member in a first direction towards the first end or in a second direction toward the second end.

The device further includes a first switch-type Hall effect detector and a second switch-type Hall effect detector both of which are mounted on the stationary continuum with the first and second Hall effect detectors positioned on opposite sides of a home position and equally spaced from the home position. The first Hall effect detector has a first detection range within which the first Hall effect detector will send a first signal to the computer in response the presence of the magnet and the second Hall effect detector in similar fashion has a second detection range in which the second Hall effect detector will send a second signal to the computer in response to the presence of the magnet.

Even though switch-type Hall effect detectors have only two states, activated and deactivated, such devices have a precise actuation threshold. Accordingly, when a moveable member having a magnet moves into the detection range of a switch-type Hall effect detector, the detector will, for all practical purposes, change position at exactly the same position along the continuum every time. When two similar detectors are mounted on a continuum and a magnet moves along the continuum and parallel to a line through the two detectors, the detector ranges of the two Hall effect detectors will be equal in length, and each detection range has clearly detectable out ends.

The computer has a memory and the device further includes a detector for measuring movement of the moveable member with respect to the continuum. The memory of the computer can therefore retain a record of the distance between the edges of the two detection ranges that bracket the home position. The microprocessor will also retain in its memory a record of the last direction of movement of moveable member, the last detector actuated, and the distance the moveable member has moved from the edge of the last detection range. From the information in the memory, as updated from the various detectors, the microcomputer can calculate a midpoint between the two ranges, which will be the home position, and determine which direction the moveable member must move to go toward the home position.

In the preferred embodiment, each time that the headlights of an automobile are turned on, the computer will move a moveable member from the range of the first Hall effect detector to the range of the second Hall effect detector to thereby re-establish the distance between the first range and the second range, and recalculate a midpoint thereby maintaining that an accurate determination of the home position.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENT

Figure 1:
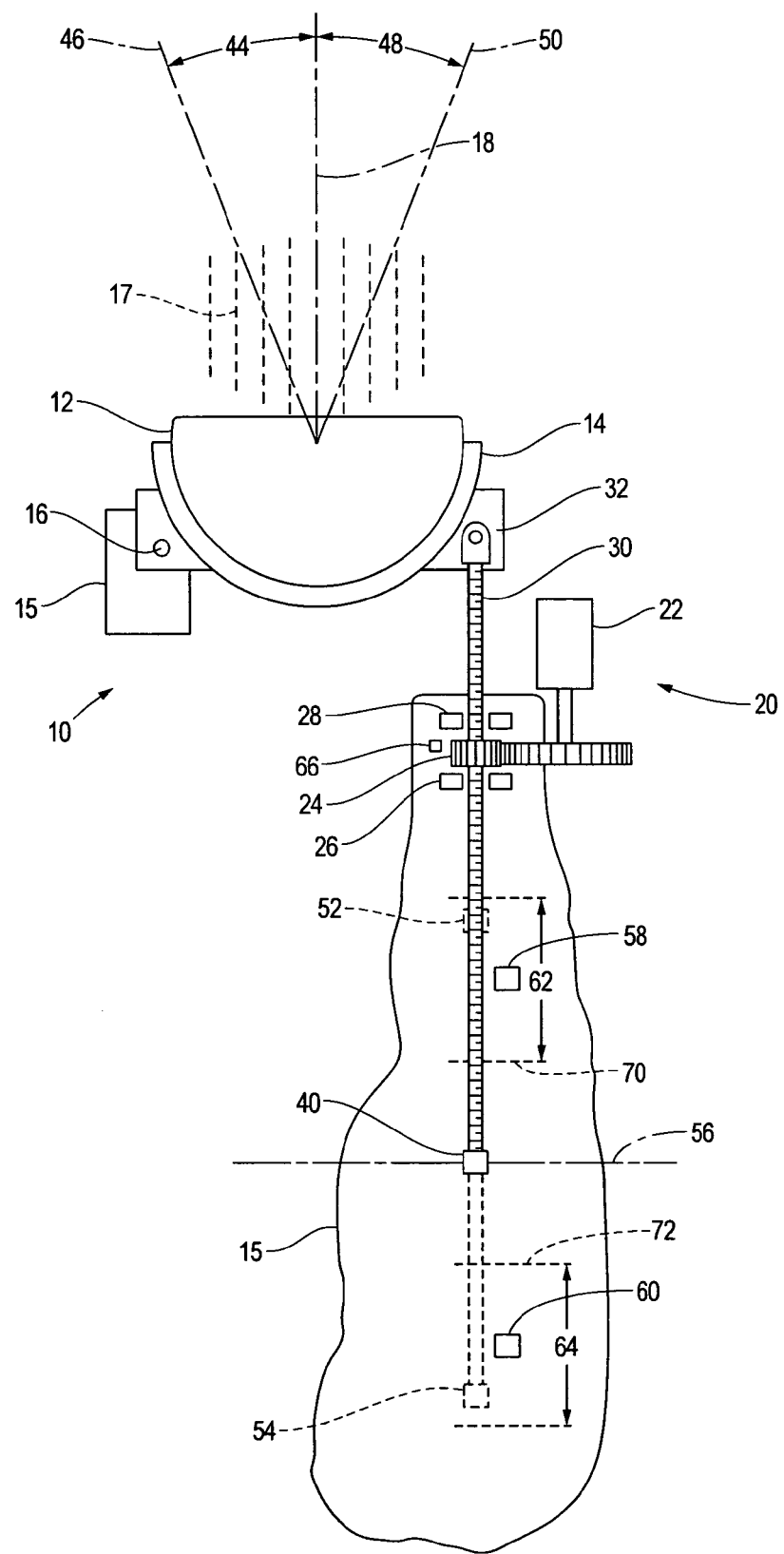
FIG. 1 is a schematic view of an electronically controlled device for aiming a headlight of a motor vehicle incorporating the present invention.
Figure 2:
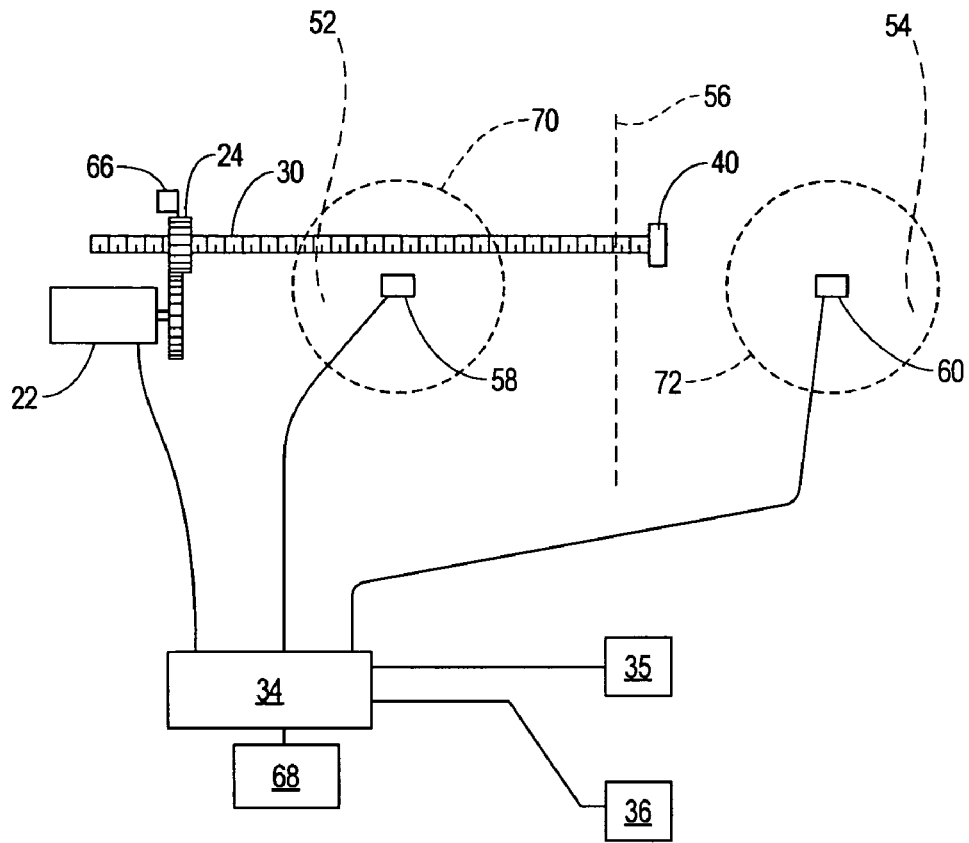
FIG. 2 is a schematic drawing of the elements of the present invention with the ranges of the two Hall effect detectors spaced from one another.

Referring to FIGS. 1 and 2, an electronically operated adjustable device such as a headlight assembly 10 includes a lamp 12 mounted on a moveable retainer 14 that is pivotable with respect to a vehicle frame 15 about a generally horizontal axis 16 such that the beam 17 issued from the lamp 12 can rotate with respect to the axis 16 to aim left or right of a centerline 18 to illuminate a curved roadway. A control device 20 for controlling the rotation of the moveable retainer 14 with respect to the axis 16 and the vehicle frame 15 includes a motor 22 for rotating an annular threaded nut 24 that is retained against axial movement by retaining members 26, 28 mounted on the frame 15. Extending through the bore of the nut 24 is an elongate threaded shaft 30, one end of which is connected to the moveable retainer 14 by a connector 32 that locks the shaft 30 against axial rotation but allows the shaft 30 to adjust with respect to the moveable retainer 14 as the retainer turns. Accordingly, rotation of the motor 22 causes rotation of the threaded nut 24 and axial movement of the elongated threaded shaft 30 thereby causing rotation of the retainer 14 around the axis 16 and angular movement of the beam 17 from the lamp 12. Rotation of the motor 22 in a first direction will cause the beam 17 from the lamp 12 to move towards the left, as depicted in FIG. 1, and rotation of the motor 22 in the second direction will cause the beam 17 from the lamp 12 to move to the right.

The operation of the motor 22 is controlled by a microprocessor 34 that receives information from detectors 35, 36 connected to the front wheels, not shown, of the vehicle such that the microprocessor 34 can determine the turning radius of the vehicle and thereby calculate the appropriate angle that the lamp 12 should be rotated with respect to the axis 16 to illuminated the roadway ahead. The use of a microprocessor and detector, such as detectors 35, 36 to turn the beam of a headlight to illuminate a turn is well known in the art.

When the vehicle, not shown, is proceeding along a straight roadway, that is a roadway without curves, the beam 17 from the lamp 12 should be directed immediately forward of the vehicle along the centerline 18, and therefore when the microprocessor 34 is not receiving input from the detectors 35, 36 indicating that the vehicle is undertaking a turn, the elongate shaft 30 of the control device 20 should return to a home position that corresponds with the beam 17 from the lamp 12 aligned with the centerline 18. In order to find the home position the shaft 30 has attached to the end opposite the pivotal connector 32 a magnet 40 such that the magnet 40 moves longitudinally with the shaft 30 with respect to the vehicle frame 15.

The lamp 12 and beam 17 are rotatable left of the centerline 18 through an arc 44 to a first outer end position 46 and rotatable towards the right side of the centerline 18 through an arc 48 to the second outer end position 50. To undertake this movement, the magnet 40 on the end of the shaft 30 is longitudinally moveable between a first outer end position 52, corresponding to the beam 17 of the lamp 12 being in the first outer end position 46 and a second outer end position 54 corresponding to the beam 17 from the lamp 12 being in the second outer end position 50. Somewhere between the first outer end position 52 and the second outer end position 54 is a home position 56 in which the beam 17 from the lamp 12 is directed along the centerline 18. It should be appreciated that the home position 56 may not be precisely midway between the first outer end position 52 and the second outer end position 54 although the operation of the control 20 is maximized when the home position 56 is generally centered with respect to the outer end positions 52, 54. To operate properly, the microprocessor 34 must be able to return the shaft 30 and the magnet 40 thereon to the home position 56 whenever the wheels of the vehicle are aligned for forward movement without turning to the left or right.

To find the home position 56, the present invention includes a first switch-type Hall effect detector 58 that is mounted on the vehicle frame 15 and along a continuum that extends adjacent the path of movement of the magnet 40, between the first outer end position 52 and the second outer end position 54 and generally near the first outer end position 52. A second switch-type Hall effect detector 60 is positioned along the continuum equally distant from the path of movement of the magnet 40 between the first and second outer end positions 52, 54 and generally near the second outer end position 54. The first and second switch-type Hall effect detectors 58, 60 are also positioned on opposite sides of the home position 38 and are equally distant from the home position 56. Accordingly, when the shaft 30 is moved to a position at or near the first outer end position 52 the magnet 40 will actuate the first Hall effect detector 58 causing it to change positions and to thereby send a first signal to the microprocessor 34, and when the shaft 30 is in a position at or near the second outer end position 54 the second switch-type Hall effect detector 60 will change positions, thereby sending a second signal to the microprocessor 34.

Referring to FIG. 2, since the first and second Hall effect detectors 58, 60 are switch-type detectors, the detectors 58, 60 are only actuated when the flux from the magnet 40 exceeds the threshold levels, which occurs when the magnet 40 is within a certain fixed distance from one of the Hall effect detectors 58, 60. It should be appreciated that although the detectors 58, 60 are equally spaced from the home position 56, the distance between the first outer end position 52 and the first Hall effect detector 58 may not be equal to the distance between the second outer end position 54 and the second Hall effect detector 60. To operate most efficiently, however, it is desirable that the first range of detection 62 for the first Hall effect detector 58 extend to the first outer end position 52 and that the second range of detection 64 for the second Hall effect detector 60 extend to the second outer end position 54.

In addition to the first and second Hall effect detectors 58, 60, the device further includes a detector 66 for measuring axis movement of the threaded shaft 30. The detector 66 may be in any form of a detector which will measure axial movement, and is preferably in the form of a counter that will count the number of rotations of the threaded nut 24. Since the threaded shaft 30 has a given number of threads per inch of length, a fixed number of rotations of the threaded nut 24 are needed to cause one inch of movement of the shaft 30 with respect to the threaded nut 24, and cause a corresponding movement of the magnet 40 with respect to the continuum between the first outer end position 52 and the second outer end position 54. The output from the measuring device 66, or counter, is directed to the microprocessor 34.

To operate properly, the microprocessor 34 includes a memory for retaining therein certain information which, in combination with the input from the first and second Hall effect detectors 58, 60 and the measuring device 66 will enable the microcomputer 34 to return the shaft 30 and the magnet 40 thereon to the home position 56 whenever the wheels of the vehicle are aligned for rolling down a straight roadway.

To ensure that the microcomputer 34 always has an accurate memory of the location of the home position 56, the microprocessor 34 is preferably programmed to periodically calibrate the home position. To calibrate the home position 56, the microprocessor 34 will direct the motor 22 to move the beam through a full sweep between the first outer end position 46 and the second outer end position 50. As the beam undertakes a full sweep, the magnet 40 will move axially from the first outer position 52 to the second outer position 54, or in the reverse direction, from outer position 54 to outer position 52. If the magnet 40 begins its sweep from within the first range of detection 62 of the first detector 58, it will move out of the first range of detection 62 through the dead space between the two detectors 58, 60 and then enter the second range of detection 64. To find the home position 56, the microprocessor 34 will take a reading from the detector 66 corresponding to the inner edge 70 of the first range of detection 62 and a second reading for the inner edge 72 of the second range of detection 64, then divide the distance between the inner edges 70, 72 in half to identify the location of the home position 56. The microprocessor 34 will retain the distance between the inner edges 70, 72 respectively in its memory 68. The memory 68 of the microprocessor 34 will also retain information as to the last of the Hall effect detectors 58, 60 to be actuated and the distance, as indicated by detector 66, that the magnet 40 has moved away from the last Hall effect detector 58, 60 to be actuated. From this information, the microprocessor will always know the position of the magnet 40 with respect to the home position 56 and can always return the magnet 40 to its home position 56. Where the microprocessor is programmed to recalculate the home position each time the lamps 12 are to be illuminated, the exact location of the home position 56 will not be lost as a result of the passage of time, by being dropped from memory, or by mechanical defects of the parts.

Figure 3:
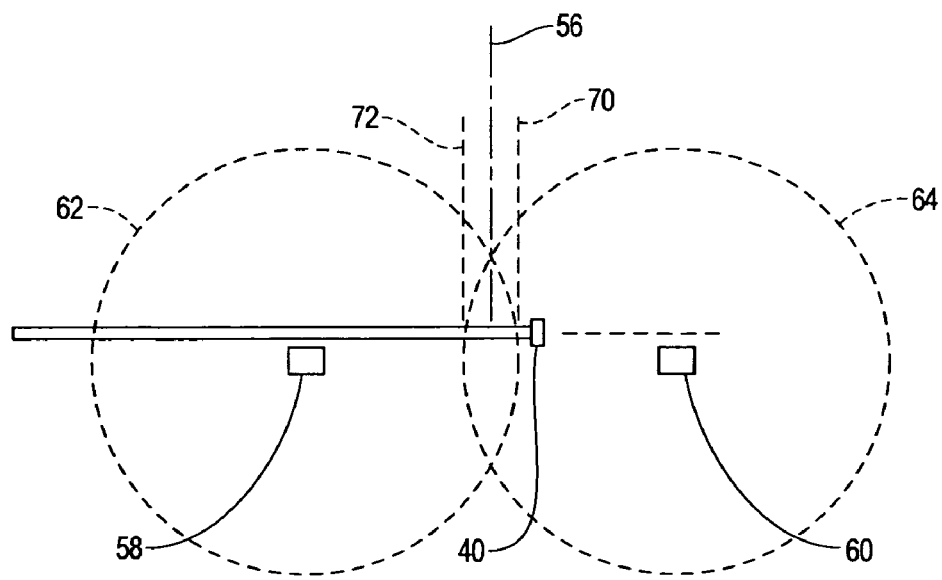
FIG. 3 is a schematic drawing of the elements of the present invention in which the activation ranges of two Hall effect detectors overlap.

Referring to FIG. 3, the device will work equally well if the distance of movement of the moveable member 30 is short compared to the length of the ranges 62, 64 of the two detectors 58,60 such that the ranges 62, 64 overlap. In this configuration, the home position 56 is still midway between the inner edge 70 of the first detection range 63 and the inner edge 72 of the second detection range 64.

While the present invention has been described with respect to a single embodiment, it will be appreciated that many modifications and variations can be made without departing from the spirit and scope of the invention. It is therefore the intent of the appended claims to cover all such modifications and variations that fall within the spirit and scope of the invention.

What is claimed:

1. A device for moving a moveable member to a home position along a stationary continuum, said stationary continuum having a first end, a second end, and said home position between said first and second ends, said device comprising
   a magnet on one of said moveable member and said continuum,
   a motor drivingly connected to said moveable member for moving said moveable member along said continuum,
   a computer controlling said motor for directing movement of said moveable member in a first direction toward said first end and in a second direction toward said second end,
   a first switch-type Hall effect detector and a second switch-type Hall effect detector on the other of said moveable member and said continuum,
   said first and second Hall effect detectors on opposite sides of said home position and equally spaced from said home position,
   said first Hall effect detector having a first detection range within which said first Hall effect detector will send a first signal to said computer in response to the presence of said magnet,
   said second Hall effect detector having a second detection range within which said second Hall effect detector will send a second signal to said computer in response to the presence of said magnet,
   wherein said computer will calculate a midpoint between first and said second ranges to find said home position and operate motor to move said moveable member toward said home position.

2. The device of claim 1 wherein
   said computer includes a memory and said device further comprises
   a detector for measuring a distance of movement of said moveable member along said continuum, and wherein said memory records a distance between said first range and said second range, records the last of said first and second Hall effect sensors to be activated, and records a distance said moveable member has moved away from said range of said last of said first and second Hall effect sensors to be activated.

3. The device of claim 1 wherein said first range includes said first end.

4. The device of claim 3 wherein said second range includes said second end.

5. The device of claim 1 wherein said first range overlaps an end of said second range.

* * * * *